Patented Nov. 28, 1950

2,531,439

UNITED STATES PATENT OFFICE 2,531,439

VITAMIN-ENRICHED PRODUCT AND PROCESS OF PRODUCING SAME

John W. Jordan, Pittsburgh, Pa., assignor to National Lead Company, New York, N. Y., a corporation of New Jersey No Drawing. Application January 10, 1946, Serial No. 640,380

9 Claims. (Cl. 99—11)

This invention relates to vitamin products capable of addition to food products in order to vitamin-enrich the same.

It is well known that certain of the vitamins, especially $B_1$, or thiamin hydrochloride, are water soluble and are consequently retained with difficulty on vitamin-enriched food products, particularly the cereals such as rice. No chemical reagent is at present known for producing an insoluble compound of thiamin which can be utilized for nutritional purposes. This applies also to vitamin $B_2$ (G) or riboflavin and to niacin or nicotinic acid.

Considerable effort has been devoted to the development of a process for the enrichment of cereal grains. In the commercial processing of rice the polishing operation removes the dark colored hull of the rice kernels containing practically all of the vitamin content of the whole grain. In order to restore these lost materials several processes have been developed, the chief of which depends upon the high pressure impregnation of the kernels with an aqueous solution of the vitamins. This process involves complicated and expensive equipment which must be manipulated on a batch program by technically competent operators. A simple method would be to evaporate a solution of the vitamins on the surface of the grains. Retention of the vitamins through the customary water rinse, however, has been found to be very poor.

Some of the objects of this invention are to provide a vitamin product which is not soluble or readily soluble in water; to provide a food product which is enriched by such a vitamin; to provide an insoluble composition of one or more of the water-soluble basic reacting vitamins such as thiamin, niacin and riboflavin; and to provide a vitamin-enriched cereal product capable of retaining its added vitamin content through the normal pre-cook rinse.

Further objects are to provide processes of producing such products; a process of insolubilizing one or more of the water-soluble basic reacting vitamins; and a process for enriching cereal products with one or more of the basic reacting water soluble vitamins.

Further objects will appear from the detail description in which will be set forth illustrative embodiments of this invention; it will be understood, however, that this invention is susceptible of various embodiments, within the scope of the appended claims, without departing from the spirit of this invention.

Generally stated and in accordance with illustrative embodiments of this invention, a modified clay initially exhibiting a substantial base-exchange capacity is reacted with a vitamin to an extent sufficient to substantially replace the cation of the clay with a cation of the vitamin but in order to retain substantially the adhesive character of the clay. This modified clay is applied as a surface-coating to a food product such as a cereal which is thus vitamin-enriched thereby. This latter can be accomplished because of the fact that the modified clay is of a character to retain its adhesiveness so that it can be applied to the food product without an additional adhesive. It is to be understood that the expressions "a surface-coating" and "surface-coating" are used descriptively and not limitatively.

In order to successfully carry out the process, two factors should be observed; namely, first, the clay should be one which exhibits a substantial base-exchange capacity; second, the reaction of the vitamin with the clay should be to an extent sufficient to replace the cation of the clay with a cation of the vitamin. Unless these two factors are present and actually effected, then there may be simply an absorption or adsorption of the vitamin on the base material. Third, the reaction of the clay with the vitamin should be substantial but in order to retain substantially the adhesive character of the clay. In accordance with the illustrative embodiment, the above is accomplished, by reacting 10-100 milliequivalents of the vitamin with 100 grams of the clay.

The clays which are useful as starting materials in accordance with this invention are those exhibiting base-exchange properties, particularly those exhibiting substantial or comparatively high base-exchange properties and containing cations capable of more or less easy replacement. The term "clay," as used in the specification and the claims, includes montmorillonite, such as the sodium and magnesium bentonites, nontronite, attapulgite, illite, zeolites, fuller's earth, particularly those of the Georgia-Florida type, halloysite, kaolinite, nacrite and dickite. These clays, as a result of certain structural atomic displacements, are believed to have negative charges which are normally neutralized by inorganic cations. As found in nature, therefore, they exist as salts of the weak clay acid with bases such as the alkali or alkaline earth metal hydroxides.

The base-exchange capacities of the various clays enumerated run from a low of about 10 to a high of about 100, based upon milliequivalents of exchangeable base per 100 grams of clay. Generally the clays of higher base-exchange capacities are particularly useful where high exchange of an organic base for the cation of the clay is desired.

For convenience, the examples given are those in which bentonite is used as the base material, this bentonite being a Wyoming bentonite in which the cation is sodium a metallic cation and in which the bentonite is a swelling bentonite; it will be understood, however, that other clays may be employed for that purpose and all of these, constituting as they do substantial base-exchange silicates, are hereinafter referred to particularly in the claims, under the term "clay."

Colloidal hydrous silicate materials exhibiting base-exchanging properties and exemplified by the colloidal clay bentonite are capable of exchanging inorganic cations for cationic organic bases. That is, they behave like salts of large inorganic acids and as such can undergo metathesis with other salts. For example:

(1)
$$Na^+bentonite^- + C_4H_9NH_3^+Cl^- \rightarrow$$
$$C_4H_9NH_3^+bentonite^- + Na^+Cl^-$$

While the basic reacting vitamins are considerably more complex than butyl amine they nevertheless are similar in their fundamental character and are capable of similar exchange reactions. Three of these compounds are pictured below with possible reactive groups indicated by asterisks.

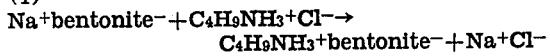

Thiamin hydrochloride, molecular weight 337.27

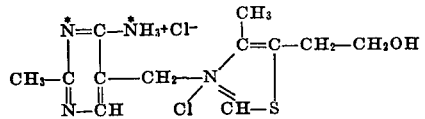

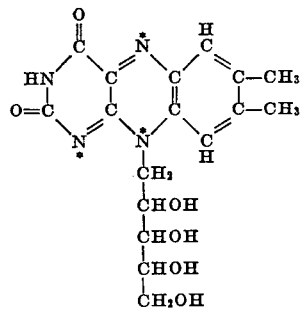

Riboflavin, molecular weight 376.36

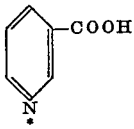

Nicotinic acid, molecular weight 123.11

The swelling of bentonite in water is one of its most striking properties. This property of swelling in water, however, is lost when the clay is reacted by base-exchange with most organic ammonium type bases. Thus when a slurry of a substituted ammonium bentonite is filtered and the precipitate dried the dry residue no longer swells upon immersion in water. A further characteristic of these organic base bentonites is that when evaporated from aqueous slurry onto a surface, they not only exhibit adhesiveness to a fairly high degree as does bentonite itself, but also retain their adhesive character in the presence of water because of the absence of the tendency to absorb water or to swell in it.

In the following practice of the invention a 1% stock dispersion of bentonite in water is prepared and allowed to stand to settle out the non-bentonite impurities such as quartz. This is used for subsequent reaction with thiamin, riboflavin and niacin in aqueous solution. Thiamin hydrochloride solution is made up in 0.1% concentration. For optimum efficiency in use of bentonite it is preferred to add the thiamin solution to the bentonite dispersion to give a solids ratio of 40 millimols of thiamin per 100 g. of bentonite. This figure may be varied over a considerable range, although with a higher ratio of thiamin the percent base-exchange decreases. The ratio may be decreased without affecting adversely the retention of vitamin on the clay, but at low ratios the waterproofing effect of the amine on the bentonite decreases and hence the adhesiveness of the deposit likewise, especially through any water rinse. The pH of the system is adjusted to about 3.5 with hydrochloric acid to insure conversion of any free organic basic compound to salt form. 97% base exchange of thiamin is observed at pH 3.5 using 40 millimols of thiamin per 100 g. of bentonite.

Riboflavin is similarly treated, using a 0.01% aqueous solution. At pH 3.5 it is preferred to use approximately 10 to 20 millimols of riboflavin per 100 g. of bentonite.

Using a 0.1% solution of niacin it is preferred to use 100 millimols of niacin per 100 g. of bentonite at pH 3.5.

In treating a cereal or cereal product the three dispersions described above are mixed together and applied to the cereal material in any one of several ways such as by spraying onto the cereal as it travels along a conveyor or by a simple batch type mixing. Drying of the damp mass may be carried out in any convenient manner, as by passage by conveyor through a drying chamber, etc. Grains so treated may be subjected to vigorous rinsing in water without removal of any appreciable quantity of the vitamin-bentonite coating.

As specific examples, I may cite the following:

Example 1

11 g. of a Wyoming bentonite was dispersed in 1 liter of water. After standing for one hour the slurry was decanted from settled impurities yielding approximately a 1% dispersion. 1.5 ml. of this dispersion was mixed with 2 ml. of the stock 0.1% thiamin hydrochloride solution. The pH of the resulting slurry was adjusted to 3.5 by the addition of hydrochloric acid. 1.6 ml. of the bentonite dispersion was mixed with 12 ml. of the 0.01% riboflavin solution and the pH similarly adjusted to 3.5. 13 ml. of bentonite dispersion was mixed with 16 ml. of the 0.1% niacin solution and the pH likewise adjusted to 3.5. Flocculation of the bentonite occurred in each case. The three slurries were stirred together and mixed with one pound of dry polished rice. After thorough agitation to assure uniform distribution of the treated bentonite over the surface of the rice grains the damp mass was dried in an air circulating oven at 125° F. The resultant coating was adherent in the dry state and was retained practically intact through a vigorous water rinse.

Example 2

15 ml. of a 1% Wyoming bentonite dispersion was mixed with 20 ml. of a 0.1% aqueous thiamin hydrochloride solution. Reaction of the vitamin with the bentonite was indicated by flocculation of the clay. This suspension was sprayed onto 10 lb. of dry hominy grits in a mixer, thereby securing fairly uniform distribution of the bentonite-vitamin complex over the surface of the grits. Drying of the grits at 125° F. brought about good adherence of the vitamin-clay complex.

*Example 3*

12 ml. of 0.01% aqueous riboflavin solution was mixed with 1.6 ml. of 1% aqueous bentonite dispersion and the pH adjusted to about 4 with dilute hydrochloric acid. The flocculated clay-vitamin complex, suspended in water, was then mixed in with 1 lb. of dry polished rice. Upon drying at 125° F. the rice grains exhibited an adherent yellow coating of the insolubilized vitamin.

*Example 4*

1600 ml. of 0.1% niacin solution was mixed in with 1300 ml. of 1% aqueous Wyoming bentonite dispersion and the pH adjusted to 4 with dilute hydrochloric acid. The flocculated clay-niacin complex was filtered out, dried and granulated to light cream colored grains resembling salt. This insolubilized niacin product was thoroughly mixed with dry polished rice in the proportion of 13 g. to 100 lb. of rice.

It is to be understood that, although the above examples illustrate cereal enrichment, the invention may be applied to other food products which go through rinsing or washing treatments, in which case the insolubilized water soluble B group of vitamins may be adhesively coated onto the food product.

The invention having thus been described, what is claimed is:

1. A composition for the treatment of food products, comprising a modified clay initially exhibiting substantial base-exchange capacity, in which the clay cation has been substantially replaced by a substituted cation of a vitamin by reacting 10–100 milliequivalents of the vitamin with 100 grams of the clay, but in order to retain substantially the adhesive character of the clay, the vitamin being of a class consisting of thiamin, niacin and riboflavin.

2. A process of making a composition for the treatment of food products, comprising, reacting a clay exhibiting substantial base-exchange capacity with a vitamin, in the proportions of 10–100 milliequivalents of the vitamin to 100 grams of the clay and to an extent sufficient to substantially replace the cation of the clay with the cation of the vitamin but in order to retain substantially the adhesive character of the clay, the vitamin being of a class consisting of thiamin, niacin and riboflavin.

3. A food product which is vitamin-enriched by a surface-coating of a modified clay initially exhibiting substantial base-exchange capacity in which the clay cation has been substantially replaced by a substituted cation of a vitamin but in order to retain substantially the adhesive character of the clay, the vitamin being of a class consisting of thiamin, niacin and riboflavin.

4. A cereal which is vitamin-enriched by a surface-coating of a modified clay initially exhibiting substantial base-exchange capacity, in which the clay cation has been substantially replaced by a substituted cation of a vitamin but in order to retain substantially the adhesive character of the clay, the vitamin being of a class consisting of thiamin, niacin and riboflavin.

5. A composition for the treatment of food products, comprising a modified swelling bentonite in which the metallic cation has been substantially replaced by a cation of a vitamin by reacting 10–100 milliequivalents of the vitamin with 100 grams of the bentonite but in order to retain substantially the adhesive character of the bentonite, the vitamin being of a class consisting of thiamin, niacin and riboflavin.

6. A food product which is vitamin-enriched by a surface-coating of a modified swelling bentonite in which the metallic cation has been substantially replaced by a cation of a vitamin but in order to retain substantially the adhesive character of the bentonite, the vitamin being of a class consisting of thiamin, niacin and riboflavin.

7. A process of making a composition for the treatment of food products, comprising, reacting a swelling bentonite with a vitamin in the proportions of 10–100 milliequivalents of the vitamin to 100 grams of the bentonite and to an extent sufficient to substantially replace the metallic cation of the bentonite with a cation of the vitamin but in order to retain substantially the adhesive character of the bentonite, the vitamin being of a class consisting of thiamin, niacin and riboflavin.

8. A process of vitamin-enriching a food product, comprising, surface-coating such a food product with a modified clay initially exhibiting substantial base-exchange capacity in which the clay cation has been substantially replaced by a substituted cation of a vitamin but in order to retain substantially the adhesive character of the clay, the vitamin being of a class consisting of thiamin, niacin and riboflavin.

9. A process of vitamin-enriching a cereal, comprising, surface-coating a cereal with a swelling bentonite in which the metallic cation has been substantially replaced by a cation of a vitamin but in order to retain substantially the adhesive character of the bentonite, the vitamin being of a class consisting of thiamin, niacin and riboflavin.

JOHN W. JORDAN.

REFERENCES CITED

The following references are of record in the file of this patent:

UNITED STATES PATENTS

| Number | Name | Date |
| --- | --- | --- |
| 1,173,317 | Seidell | Feb. 29, 1916 |
| 1,964,867 | Allyn | July 3, 1934 |
| 2,188,319 | Siemers | Jan. 30, 1940 |
| 2,300,439 | Van der Lee | Nov. 3, 1942 |
| 2,381,342 | Furter | Aug. 7, 1945 |